A.C. MOTOR SERVO MECHANISM FOR TAPE TRANSPORTS

Filed Sept. 10, 1963 2 Sheets-Sheet 1

INVENTOR
JOHN PAUL JONES, JR.

BY Watson, Cole, Grindle & Watson
ATTORNEYS

A.C. MOTOR SERVO MECHANISM FOR TAPE TRANSPORTS

Filed Sept. 10, 1963 2 Sheets-Sheet 2

INVENTOR
JOHN PAUL JONES, JR.

BY Watson, Cole, Grindle & Watson
ATTORNEYS

United States Patent Office 3,318,544 Patented May 9, 1967

3,318,544
A.C. MOTOR SERVO MECHANISM FOR TAPE TRANSPORTS

John Paul Jones, Jr., Wynnewood, Pa., assignor to Navigation Computer Corporation, Norristown, Pa., a corporation of Pennsylvania Filed Sept. 10, 1963, Ser. No. 307,886
12 Claims. (Cl. 242—55.12)

This invention relates to digital recording tape transport systems and in particular, it relates to servo controls for driving tape transports.

In conventional servo drive systems, a record tape of magnetic or paper tape is passed between a pair of reels which respectively dispense the tape and store it under control of feedback signals. Tape transport apparatus of this type is reversible in some cases so that tape may be passed in either direction.

When processing digital data at high speeds, it is necessary to prevent the winding and reeling from interfering with the digital processing operation. In order to dispense tape from storage reels having high inertia when the transducing of bits of data on the tape must be accomplished instantaneously at high speeds in incremental fashion either bit-by-bit or block-by-block, the servo mechanism must act quickly to control an average length of tape in low inertia loops so that the digital processing may proceed without directly winding and reeling the relatively heavy tape reels. This requires operation of the reels separately from the tape feed past the digital processor transducer head. Careful control of the tension in the transducing area thus in desirable with automatic control of dispensing and tape-up reels to assure an adequate average supply of tape to a low inertia incremental feed loop.

Complex servo systems and elaborate mechanisms have been developed for tensioning and reeling the tape so that small increments of tape may be controlled at high instantaneous speeds past the transducing head. Probably the most common of these control devices include direct current servo drive systems which use tensioning arms coupled to a potentiometer to provide error signals as the arms depart from a normal position. Such servo systems require linear amplification and direct current drive motors, resulting in such high cost that only sophisticated systems are able to justify use of such devices. When reversible direction is required, these direct current servo systems are even more complicated and are essentially doubled in extent of equipment and cost.

Attempts to simplify the direct-current servo system drives by use of alternating current motors have met with unsatisfactory performance, particularly, in digital magnetic tape systems where low level transducing circuits are incorporated because of large magnitude switching transients introduced when intermittently energizing and de-energizing the motors.

Alternative lower cost systems of the prior art depend upon electromechanical controls engaging slip-clutches with differentially driven reels, and the like. Thus, wear and tear is a major problem, and frequent maintenance is required. Large motors with excessive power ratings generating significant heat are required to run continuously in most of these systems.

Other problems in prior art systems include the dependence upon mechanical switching devices which must be used in control circuits. Switching contacts in such devices readily pit when exposed to switching transients and extraneous corrosion, and may not be expected to operate reliably over long periods of time.

Thus, it is an object of the invention to provide improved inexpensive tape control apparatus which resolves the above problems.

Another object of the invention is to provide an alternating current servo system for tape transport which is operable in the presence of low level digital signals.

A further object of the invention is to provide simple efficient bidirectional controls for dispensing tape for use in digital data processing systems.

A still further object of the invention is to provide for simplified intermittently operable tape drive systems using alternating current motors.

Another primary object of the invention is to provide acceptable performance in simplified digital recording tape transports having high reliability and affording long service without malfunction or maintenance.

Yet another object of the invention is to provide improved switching performance in intermittently operated alternating current motor control circuits.

Thus, in accordance with the invention, a simplified servo system is afforded utilizing separate alternating current motors for driving respective reels which dispense and take-up excessive digital recording tape as it is being processed digitally and intermittently advanced past a transducing head. Reliability and simplicity is achieved even when intermittent and frequent switching of the motor drive means is encountered. Thus, low current long life glass enclosed magnetic reed switches afford error-free control and synchronized motor energization circuits are employed to assure that the motor switching operations occur without arcing when voltage is removed from the switching contacts. Thus, not only are switching contacts made reliable, but transient impulses introduced into the system from frequent breaking of significant voltages or current levels are eliminated. As a result, very simplified control circuits produce acceptable servo controls for tensioning and transporting tape in high speed digital data processing systems.

The invention is described in more detail in the accompanying specification, wherein further features and advantages are outlined with reference to the accompanying drawings, wherein.

Figure 1:
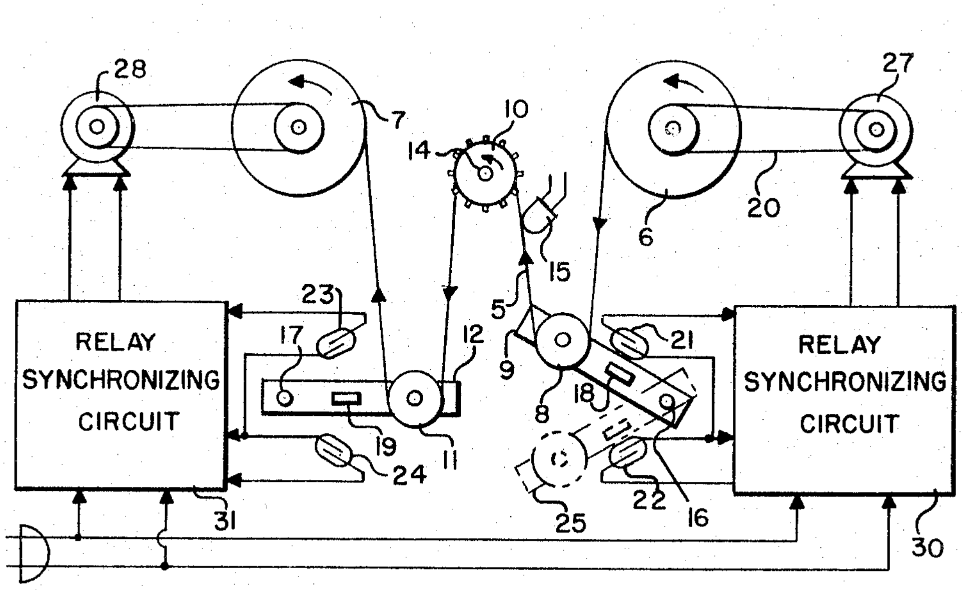
FIGURE 1 is a diagrammatic view of a tape transport tension control system embodiment of the invention.

As shown in FIGURE 1, digital tape 5 is transported from dispensing reel 6, rotatable counterclockwise, to take-up reel 7 similarly rotatable. Intermediate the two reels the tape 5 is passed about idle roller 8 on a tension arm 9, a sprocket wheel 10 and idle roller 11 on tension arm 12. Sprocket wheel 10 is coupled by shaft 14 to tape drive means such as a stepping motor 4 (FIGURE 3) which serves to intermittently advance the tape past the transducing head 15, in a bit-by-bit stepping action which permits reading the digital data from the tape 5 either in coded character or coded block form.

Each of the tension arms 9, 12 is either gravity biased or has external spring means to retain the tape 5 taut in substantially uniform tension in a loop of controlled length about the respective rollers 8, 11, as the tension arms are pivoted about respective pivot axes 16, 17. In order to act as loop length detection means, each pivoted tension arm 9, 12 has a corresponding permanent magnet 18, 19 affixed thereto for displacement in position. The magnet in each case serves to close corresponding sets of magnetically operated hermetically sealed reed contacts 21, 22 and 23, 24 associated as limited sensing devices for movement of the tension arm 9 for example, shown in its uppermost position and in phantom view in its lowermost position 25. Each tension arm may act independently within its range of movement as defined by the position of the switch and need not necessarily be in a position related to the other arm.

Since each reel 6, 7 is independently driven from an individual alternating current motor 27, 28, the dispensing and take-up functions of reels 6 and 7 are separately performed as the loops about respective rollers 8 and 11 permit the corresponding switch sets to operate the respective motor through intermediate switching means such as relay synchronizing circuit 30, 31. This switching circuit functions to sense the respective limit position of the corresponding tape loop through a switch contact set, and to operate the motor as long as the loop remains in the limited range defined by the switch set position. After the tension arm is moved sufficiently to reach the opposite switch position, the motor is turned off thereby permitting processing about sprocket 10 without further reel movement until the loop length again reaches the limit of its range. The motors may be geared down to provide the proper drive speed directly to the spools or through the drive pulleys 20.

Thus, specifically in dispensing tape from storage reel 6, the motor 27 is energized to drive reel 6 counterclockwise whenever the loop is short enough by action of sprocket 10 to place magnet 18 immediately adjacent to upper switch contact set 21. This increases the length of the tape loop while the tape is held in tension about roller 8, as the tension arm 9 pivots about point 16, until the magnet 18 reaches switch 22 and the motor 27 is de-energized.

Similarly, the take-up reel 7 is operated, except that the lower switch 24 serves to start the motor 28 when enough tape length is fed around roller 11 from sprocket 10 to reach the range limit of pivot arm 12. The motor 28 is then de-energized when enough tape is taken up on spool 7 to lift tension arm 12 to place magnet 19 in proximity to switch 23. It is seen therefore, that very simple controls provide for proper dispensing and tensioning of tape as it is being digitally processed. In this system very inexpensive drive motors and simple switching circuits may thus be used even for very high speed data processing, without providing slip clutches, continuous motor energization, expensive servo amplifiers or the like, necessitated in prior art systems.

Figure 2:
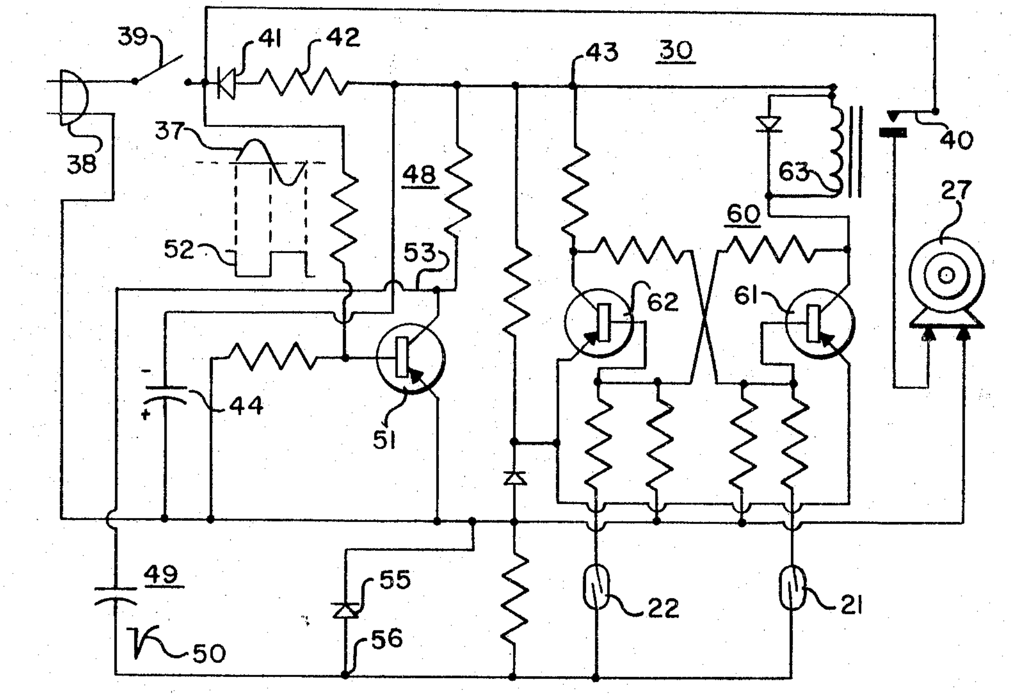
FIGURE 2 is a schematic circuit diagram of synchronized switching control means afforded in accordance with the teachings of the invention.

In accordance with one aspect of the invention, the motor switching means comprising relay synchronizing circuits 30, 31 are constructed in the manner illustrated by FIGURE 2. It has been noted that in energizing alternating current motors significant switching transients may be introduced which interfere with the digital processing circuits and tend to cause erroneous operation, particularly where low level signals are used, such as when transducer head 15 is a magnetic head for reading from magnetic tape. Thus, this circuit serves to detect the zero crossover points of the alternating current waveform 37 supplied at plug 38 through switch 39, and provides for energizing and de-energizing the motor 27 through contacts 40 without breaking significant current levels. Thus, it is seen that the switching contact life is made reliable as well as the operation of low digital processing circuits of the type associated with tape transports.

Rectifier 41 and resistor 42 serve as a direct current supply source for placing bus 43 at proper negative potential for operating the transistor circuits. Filter capacitor 44 serves to smooth out the direct current power supply waveform in a conventional manner.

The zero crossover point of the alternating current waveform 37 is detected by means of the overdriven transistor amplifier stage 48 and a differentiating network 49 providing trigger pulses 50. Thus, an attenuated line voltage signal is applied to the base of transistor 51 to produce the squared output waveform 52 at the collector terminal 53. The square wave 52 is differentiated at network 49 and is rectified by diode 55 to produce trigger pulses 50 at lead 56 which serve to switch flip-flop circuit 60 from one stable position to another.

Limit switches 21 and 22 respectively pass the trigger pulses 50 to the set and reset connections at the base of respective transistors 61, 62, so that relay 63 operates to close contacts 40 only when the flip-flop is in its set position. Thus, as before explained, the motor 27 runs responsive to closing of switch 21 and is de-energized responsive to closing of switch 22. It is clear that this circuit therefore synchronizes the switching operation with the zero-crossover points of the alternating current waveform by means of trigger pulses 50, and this prevents any significant arcing or transients at contacts 40, since the current to the motor is thus also at its zero value.

Only one motor 27 is shown, since it is evident that similar flip-flop control circuits can operate synchronously responsive to trigger pulses 50 at lead 56 in the same manner. Likewise in FIGURE 3, a single reversible drive embodiment is shown in connection with spool 6, since the remaining portion of the system is similarly constructed.

Figure 3:
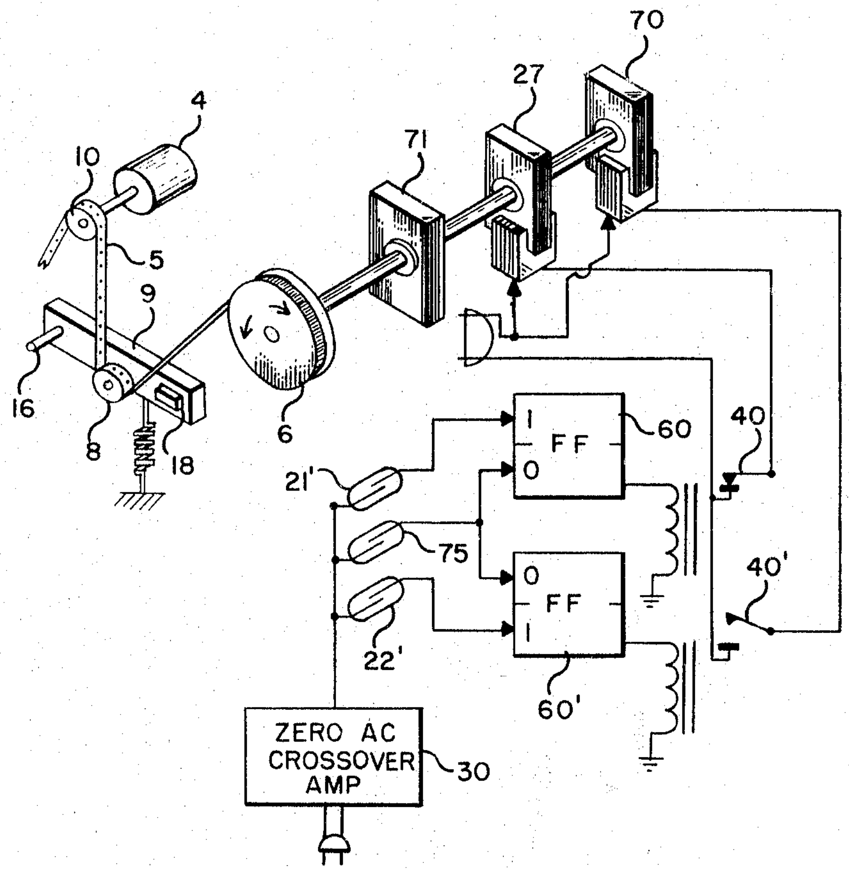
FIGURE 3 is a diagrammatic view, partly in perspective, of a bidirectional tape transport system embodying the invention.

It is seen from FIGURE 3 that the transport can readily be adapted for bidirectional drive by a simple extension of the control circuits and the addition of an alternatively selected drive motor 70 which drives spool 6 in the reverse (clockwise) direction as compared with motor 27, through gear box 71. The direction of tape travel is chosen by operation of stepping motor 4 in the proper direction, and the control circuits automatically adjust the length of the tape feed loops for either direction of travel. The motors 27, 70 are energized by respective contacts 40 and 40' closed through synchronizing flip-flops 60 and 60' (shown diagrammatically) in the manner hereinbefore described to operate only at the zero crossover position afforded by timed pulses from the block 30.

To facilitate reversal without complex switching of circuit conditions, an auxiliary or mid-position switch 75 is provided between limit switches 21' and 22'. Thus, magnet 18 serves to start motor 27 for forward dispensing (counterclockwise) as limit switch 21' is reached thereby operating flip-flop 60 to close switch 40. The motor runs throughout the range of movement of pivot arm 9 terminated when the mid-position switch 75 is reached to switch flip-flop 60 and open contacts 40. Conversely, for take-up operations when the stepping motor 4 operates in the opposite direction, motor 70 is controlled through contact 40' which is closed when lower limit switch 22' is reached by magnet 18. When mid-position switch 75 is operated as the tension arm moves magnet 18 through the range of loop length desired, the flip-flop 60' is operated to open contacts 40'. Accordingly, the present transport system also provides for simplified and reliable equipment operable without extensive control circuits while attaining fully automatic operation for both directions of tape travel. By this mode of operation the stepping motor 4 controls the direction of the tape travel through the system as automatically reeled up in either direction by operation of the switches 21′, 22′, and 75.

Figure 4:
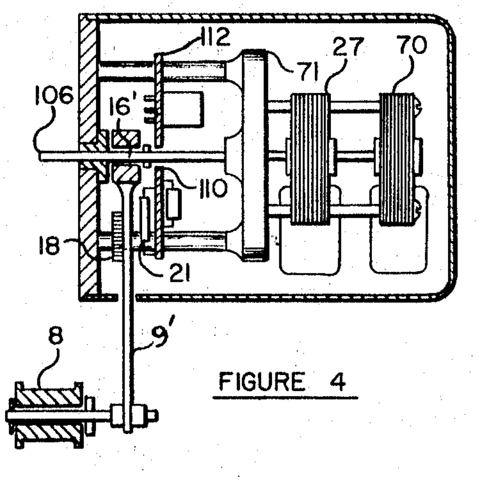
FIGURE 4 is a broken away assembly view, partly in section, of bidirectional servo drive means constructed in accordance with the invention.

Mounting of the bidirectional mechanism as a modular unit is convenient in the manner illustrated in FIGURE 4. Thus, alternating current motors 27 and 70 are coaxially aligned on a common shaft which, through gear train 71, gives appropriate speed at drive shaft 106. The pivot arm 9′ carrying magnet 18 pivots about the shaft 106 at pivot position 16′ to operate switch 21 mounted on a printed circuit board 110. Other components such as relays are mounted on a further printed board section 112. Tape reel 6 may be mounted on shaft 106 and tape threaded about roller 8 in the manner shown in FIGURE 3. Thus, a completely self-contained simple bidirectional servo module is afforded by the present invention.

It is therefore evident that the state of the art is advanced by the present invention in the manner defined with particularity in the following claims:

What is claimed is:

1. In a tape transport for digital recording apparatus, a pair of tape storage reels adapted to receive a supply of tape for thereby dispensing and taking-up excessive tape, alternating current motors coupled to drive each of the storage reels, motor switching circuits for maintaining each motor independently in energized or de-energized state when receiving corresponding control signals, transducing means, tape drive means for advancing tape incrementally past the transducing means independent of motion of the storage reels, a first tape loop length detection means including two limit switches spaced for momentary contact at each limiting end position of a range of tape loop length for controlling the dispensing of tape from one of the reels by thereby producing control signals for said motor switching circuits and energizing the respective motor when the loop length reaches one limit position and holding the motor energized when this corresponding limit switch opens until the other limit switch is contacted thereby de-energizing the motor when the loop length departs from a predetermined range, and a second similar tape loop length detection means including limit switches for controlling the take-up of tape on the remaining reel by thereby energizing its motor when the loop length reaches a limit position and de-energizing the motor when the loop length departs from a predetermined range, and means retaining a relatively constant tension on the tape throughout said range, whereby each motor is intermittently operated to transport a predetermined amount of tape while permitting independent high speed incremental processing of the tape past the transducing means.

2. A combination as defined in claim 1, wherein the loop length detection means comprises a pivoted tension arm, permanent magnet means affixed to each arm, a set of enclosed magnetically operable switch contacts positioned on each side of the arm for operation as the magnet is presented in close proximity thereto, thereby defining the range of tape length over which the motor remains energized, means operable to energize the respective motor at one limit position established by a first switch of each arm, and means operable to de-energize the respective motor at the other limit position established by the second switch of each arm, thus causing each motor to remain in either selected state until the tape loop nears the end of the range defined by the limit positions of said switch contacts.

3. A combination as defined in claim 1 including an alternating current source for driving the motors, means sensing the zero crossover points of the alternating current supplied from the source, and means synchronizing the energization and de-energization of the motors to occur at said crossover points.

4. A system as defined in claim 3, wherein the synchronizing means comprises a bistable state circuit, means deriving trigger pulses for changing the circuit state from said crossover points, selectively operable switching contacts on said limit switches coupling the trigger pulses to the respective set and reset terminals of the bistable state circuit, and switching contacts operated by the bistable state circuit in one of its states to energize the motor.

5. A combination as defined in claim 1, wherein a second alternating current motor is provided for driving each storage reel in the opposite direction from the first motor, and means selectively switching into circuit one or the other sets of motors for operation to thereby permit transport of the tape in either direction between the reels.

6. A combination as defined in claim 5, including a movable loop length sensing arm, a set of three limit switches positioned for actuation by the sensing arm at different positions, means responsive to the mid-position switch, and one outer position switch for controlling the motor energization period for one tape direction, and means responsive to the mid-position switch and the other outer position switch for controlling the motor energization period for the other tape direction.

7. The combination of a tape transport, an alternating current source, at least one alternating current motor for driving the tape in the transport, bistable state means operable to change state upon receipt of trigger controls for energizing the motor when in one of its stable states, means detecting the zero crossover position in the current from the source, and synchronized switching momentary contact supplying trigger controls for changing the state of said bistable state means for energizing and de-energizing the motor at said zero crossover positions.

8. A motor control system for an alternating current motor comprising in combination, an alternating current source, means detecting the zero crossover points of current from said source and supplying crossover signals, means operable from said crossover signals for holding the motor energized from said source, and selectively operable momentary switching contact means coupled to selectively convey said crossover signals to the means for holding the motor energized for energizing and de-energizing said motor synchronously with said crossover points.

9. A system as defined in claim 8, wherein the switching means comprises a bistable state circuit, means deriving trigger pulses for changing the circuit state from said crossover signals, a circuit including said selectively operable switching contact means coupling the trigger pulses to the respective set and reset terminals of the bistable state circuit, and further switching contacts in said means holding the motor energized operated by the bistable state circuit in one of its states to energize the motor.

10. An automatic bidirectional servo system for tape transports comprising in combination, separate alternating current motors for driving the tape transport in either direction, means for advancing tape selectively in either direction, and control means for energizing said separate motors comprising a movable sensing arm positioned by movement of tape in the transport, three aligned limit switches defining a range of tape looped about the sensing arm and operable thereby as the arm moves to the vicinity of the respective switches, bistable switching means residing in either an energized or de-energized state coupled to the outer two switches to energize respective ones of the separate motors, and means coupled to the central switch to operate the bistable switching means to de-energize the motors.

11. A servo system as defined in claim 10, wherein an alternating current source is supplied for operating the motors, synchronizing pulses are derived from the source when passing through a zero current position, and synchronizing circuits operable from said pulses to synchronously operate the bistable switching means thereby energizing and de-energizing the motors at substantially zero current points.

12. An automatic bidirectional servo system for operating tape transports comprising in combination, separate alternating current motors for driving the tape transport in the two different directions, a tape loop, means sensing the amount of tape in the loop, bistable state holding means for energizing each motor through a predetermined range of tape travel as the tape in the loop passes between limiting positions, means changing the state of said holding means at respective ones of the limiting positions, and means synchronizing the change of state operation to occur at a zero current point on the motor energization cycle.

References Cited by the Examiner

UNITED STATES PATENTS

| | | | |
|---|---|---|---|
| 2,991,022 | 7/1961 | Wallens ____________ | 242—75 |
| 3,105,179 | 9/1963 | Young et al. _________ | 242—55 |
| 3,130,357 | 4/1964 | Westlake et al. ____ | 318—56 X |
| 3,175,777 | 3/1963 | Jones ______________ | 242—55 |

FRANK J. COHEN, *Primary Examiner.*

GEORGE F. MAUTZ, *Assistant Examiner.*